United States Patent [19]

Bütje et al.

[11] Patent Number: 5,468,463
[45] Date of Patent: Nov. 21, 1995

[54] PROCESS FOR THE PREPARATION OF VERY PURE TITANIUM DIOXIDE

[75] Inventors: Kai Bütje, Duisburg; Jürgen Kischkewitz, Ratingen, both of Germany

[73] Assignee: Bayer Aktiengesellschaft, Leverkusen, Germany

[21] Appl. No.: 282,387

[22] Filed: Jul. 29, 1994

Related U.S. Application Data

[63] Continuation of Ser. No. 59,485, May 10, 1993, abandoned.

[30] Foreign Application Priority Data

May 15, 1992 [DE] Germany ............... 42 16 122.3

[51] Int. Cl.$^6$ ............... C01G 23/04; C01G 23/02
[52] U.S. Cl. ............... 423/612; 423/616; 423/615; 423/82
[58] Field of Search ............... 423/612, 616, 423/615, 82

[56] References Cited

U.S. PATENT DOCUMENTS

| | | | |
|---|---|---|---|
| 2,167,626 | 8/1939 | Alessandroni | 134/58 |
| 3,919,388 | 11/1975 | Thompson et al. | 423/612 |
| 5,030,439 | 7/1991 | Brownbridge | 423/610 |
| 5,160,150 | 11/1993 | Schmidt | 279/58 |

FOREIGN PATENT DOCUMENTS

| | | |
|---|---|---|
| 0424058 | 4/1991 | European Pat. Off. . |
| 2196375 | 3/1974 | France . |

OTHER PUBLICATIONS

V. I. Belokoskov, "The $TiO_2$—$SO_3$—$H_2O$ System at 25°, 50° and 75°" Russian Journal of Inorganic Chemistry, vol. 7, No. 2, 1962, no month, pp. 192–195.

E. Takakura, "The Equilibrium of the $TiO_2$—$SO_3$—$H_2O$ . . . . $H_2O$", Kenkyo Hobun—Asahikawa Kogyo Koto Senmon Gako 23 (1986), no month, pp. 65–69.

Chemical Abstracts, vol. 105, 30860j, 1986, no month.

*Primary Examiner*—Steven Bos
*Attorney, Agent, or Firm*—William C. Gerstenzang; Sprung Horn Kramer & Woods

[57] ABSTRACT

A process for the preparation of very pure titanium dioxide by reacting titanium tetrahalides with sulphuric acid, hydrolysis the titanyl sulphate solution obtained and calcining the hydrolysate is disclosed wherein the reaction between titanium tetrahalide and aqueous 20–40% by weight strength sulphuric acid is performed in such a way that crystallisation of titanyl sulphate does not take place, the hydrogen halide is separated, the solution is optionally concentrated and filtered and then the ratio by weight of sulphuric acid to titanium dioxide is adjusted to between 1.7 and 2.0 and the titanium dioxide concentration is adjusted to between 250 and 300 g/l, the solution is hydrolyzed and the resulting titanium oxide hydrate is filtered off and calcined to give Futile or anatase.

10 Claims, No Drawings

PROCESS FOR THE PREPARATION OF VERY PURE TITANIUM DIOXIDE

This application is a continuation, of application Ser. No. 08/059485, filed May 10, 1993, now abandoned.

The present invention relates to a process for the preparation of very pure titanium dioxide with a rutile or anatase structure by reacting titanium tetrahalides with aqueous sulphuric acid solution, hydrolysing the resulting titanyl sulphate solution and calcining the hydrolysate.

Titanium dioxide is produced industrially either by the sulphate process, in which ilmenite and/or slags containing titanium are digested with sulphuric acid, the titanyl sulphate solutions which are obtained being hydrolysed and the precipitated oxide hydrate being subjected to calcination, or by the chloride process in which natural or synthetic rutile is reacted with carbon and chlorine to give titanium tetrachloride which then undergoes combustion with a gas containing oxygen to give titanium dioxide.

A large part of the world production of titanium dioxide is used for the production of pigments. At the same time, titanium dioxide is also being considered to an increasing extent for applications not related to pigments.

In many applications of titanium dioxide what matters is the particular chemical purity of the titanium dioxide. One example is the use of $TiO_2$ for the preparation of barium titanate, which finds many applications in electroceramics. Even traces of metallic impurities have a detrimental effect on its electrical properties.

Rutile and anatase products obtained by the sulphate process generally satisfy extremely high purity demands only after relatively expensive process modifications and/or additional purification stages.

On the other hand, titanium tetrahalides, especially $TiCl_4$, are freed of heavy metal impurities relatively easily by a distillation procedure. However, the chloride process is not capable of providing titanium dioxide in the anatase form. It is this form, however, which is preferred for the production of papers, catalysts and cosmetics.

A process as described in U.S. Pat. No. 5,030,439, in which titanium tetrahalides, for example $TICl_4$, are reacted with excess, approximately 70% strength sulphuric acid, wherein titanyl sulphate is formed and crystallised. This is filtered off, dissolved in water and subjected to hydrolysis and calcination, which leads to titanium dioxide in the rutile or anatase form, depending on the reaction conditions. However, this process is very involved and expensive, since filtration has to be performed twice, both for the titanyl sulphate and for the $TiO_2$ hydrate. In addition, the dissolution process for titanyl sulphate which has only been crystallised once is, as is generally known, very time-consuming. Finally, the variable amounts of mother liquor, containing sulphuric acid, adhering to the filter cakes when the titanyl sulphate is filtered makes it difficult to adjust the conditions required for hydrolysis. In particular, if crystallisation is from a solution with a relatively high $H_2SO_4$ concentration, considerable amounts of $H_2SO_4$ adhere to the filter cakes so that on the one hand the acid number is very high, which has an unfavourable effect on hydrolysis, and on the other hand the solubility of the filter cake falls.

Thus the object was to make available a process which allows very pure titanium dioxide to be produced, in both the rutile and the anatase form, in one simple process operation.

The problem was able to be solved using the process according to the invention.

The object of the invention is a process for the preparation of very pure titanium dioxide by reacting a titanium tetrahalide with sulphuric acid, hydrolysing the titanyl sulphate solution obtained and calcining the hydrolysate, characterised in that the reaction between titanium tetrahalide and aqueous 20–40% sulphuric acid is performed in such a way that crystallisation of titanyl sulphate does not take place, the hydrogen halide is separated off, the solution is optionally concentrated by evaporation and filtered and hydrolysed, after adjusting the ratio by weight of sulphuric acid to titanium dioxide to between 1.7 and 2.0 and after adjusting the titanium dioxide concentration to between 250 and 300 g/l, the resulting titanium oxide hydrate is filtered off and calcined to give rutile or anatase.

In particular the reaction is performed with titanium tetrachloride.

In the reaction of titanium tetrahalide to give titanyl sulphate, crystallisation of titanyl sulphate is prevented by appropriate selection of the conditions employed, i.e. the concentration of the sulphuric acid, the molar ratio of the titanium compound to sulphuric acid, and the temperature. Such conditions can be determined from solubility diagrams contained in the literature, such as for example in V.I. Belokoskov, "The $TiO_2$—$SO_3$—$H_2O$ System at 250°, 50° and 75°"Russ. J Inoroan. Chem. 7, 192–195 (1962), or E. Takakura, "The Equilibrium of the $TiO_2$—$SO_3$— $H_2O$ System in Relation to the Deposition of $TiOSO_4 * 2\ H_2O$", Kenkyo Hobun —Asahikawa Kogyo Koto Senmon Gako 23 (1986), 65–69 (Chem. Abstr. 105, 30860j). Preferably the aqueous sulphuric acid has a concentration of 25 to 35% by weight. The amount of sulphuric acid is preferably between 100 and 120% of the stoichiometrically required amount for the reaction. The reaction of titanium tetrahalide with aqueous sulphuric acid is preferably carried out at temperatures between 20° and 70° C.

The hydrogen halide eliminated as a side product during the reaction of titanium tetrahalide with aqueous sulphuric acid may be separated out by passing a gas, e.g. air, through the solution, or by concentrating the solution by evaporation, optionally under reduced pressure.

Concentration by evaporation may be repeated several times, wherein the solution is diluted with water agaion each time.

Separation of the hydrogen halide by passage of a gas or by evaporation is preferably performed at temperatures between 20° and 80° C., particularly preferably at 50°–70° C.

Preferably, separation of the hydrogen halide is continued until the concentration has fallen to less than 5% by weight, calculated as chloride and relative to the dissolved titanium dioxide.

Adjustment of the concentrations of titanium dioxide and sulphuric acid preferably takes place immediately before hyrolysis by adding water and sulphuric acid or oleum.

Very pure titanium dioxide is understood to be titanium dioxide containing a maximum of 0.2%, preferably 0.1% based on the weight of titanium dioxide — of impurities, of which no more than 100 ppm are metallic.

In the first stage of the process according to the invention, a titanium tetrahalide is made to react with aqueous sulphuric acid. Titanium tetrachloride is the most suitable titanium tetrahalide due to its reasonable price, simple large-scale production and the fact that it is easy to purify by distillation (b.p. =136° C. ). The hydrogen halide or hydrogen chloride which is formed is separated out by the passage of a gas or by evaporation, leaving behind an aqueous solution of titanyl sulphate which contains sulphuric acid.

In a preferred embodiment of the process titanium tetrachloride is added dropwise to an aqueous sulphuric acid solution, whose concentration is between 20 and 40, particularly preferably 25 to 35% by weight. The amount of sulphuric acid being used is between stoichiometrically required amount and a 20% excess, corresponding to an acid number between 1.225 and 1.47, if the acid number is designated as the ratio by weight of dissolved sulphate ions, calculated as $H_2SO_4$, to dissolved titanyl ions, calculated as $TiO_2$. Here, the higher the initial concentration of sulphuric acid the lower is the acid number chosen. The reaction may in principle be performed at any temperature. However, working in the range between 20° and 70° C., where on the one hand the reaction takes place at an adequate rate and on the other hand the titanium tetrachloride losses are small, is preferred.

The resulting titanyl sulphate solution must be freed of the major proportion of dissolved hydrogen chloride by passage of a gas or by evaporation in order to exclude interference with the hydrolysis process. The solution to be hydrolysed preferably contains not more than 5% by weight of chloride, relative to $TiO_2$. Separation of the hydrogen chloride may take place by passing a gas, for example air, through the solution, or by evaporation, optionally under reduced pressure, or by a combination of the passage of a gas and evaporation. In this case it is advantageous to work at an elevated temperature, wherein, however, the temperature must not rise so high that premature hydrolysis occurs. The preferred temperature range is between 20° and 80° C., the particularly preferred temperature range being between 50° and 70° C. The evaporation process may be repeated several times, wherein the solution is diluted with water again each time.

To produce good properties in the hydrolysate it is desirable to subject the concentrated, largely chloride-free solution to a clarification filtration and to increase the proportion of sulphuric acid, expressed by the acid number, by adding concentrated sulphuric acid or oleum. This takes place expediently immediately before hydrolysis since relatively highly concentrated titanyl sulphate solutions which contain a large amount of sulphuric acid are unstable towards the crystallisation of titanyl sulphate. The desired $TiO_2$ concentration is subsequently fixed by adding water after adding the sulphuric acid or oleum.

Hydrolysis takes place in a concentration range between 250 and 300 g/l of $TiO_2$, preferably 270 to 290 g/l of $TiO_2$ at acid numbers between 1.7 and 2.0, preferably 1.8 to 1.95, at temperatures between 100° C. and the boiling point of the solution. It may be performed in known ways either as a same species seeded hydrolysis or as a different species seeded hydrolysis. The precipitated titanium dioxide hydrate is filtered off, for example using Moore or rotary filters. Surprisingly it was found that the purity of the product is so high that a reducing bleach is not generally required, in contrast with the conventional sulphate process. The dilute sulphuric acid produced as filtrate is returned to the process after concentration. The filtered titanium dioxide hydrate, which has an anatase structure, is calcined to give anatase or, generally after the addition of rutile seed crystals, to give rutile. If so desired, adjustment chemicals, for instance alkali metal salts, aluminium salts or phosphates may be added before calcining in order to produce specific clinker and pigment properties.

The invention will be explained in more detail using the following examples.

The following examples illustrate the present invention but are not intended to limit its scope in any way.

Example 1 (according to the invention)

1112 g of $TiCl_4$ were added dropwise from a dropping funnel to 1939 g of 30% by weight strength (i.e., 370 g/l concentration) $H_2SO_4$ in a 3 l flask with mechanical stirrer, reflux condenser and thermometer, over the course of 1.5 hours without external heating or cooling, wherein the mixture warmed up to a max. of 46° C. The clear, yellow solution which formed with the evolution of HCl, was evaporated almost to dryness in a rotary evaporator with a bath temperature of 60° C., made up to volume again with water and the process repeated several times until 6.5 l of distillate had passed over. After filtration through filter paper, there resulted a clear, pale yellow solution with 24.1% by weight (i.e., 16 g/l concentration) $TiO_2$, 29.2% by weight (i.e., 475 g/l concentration) $SO_4^{2-}$ and 1.0% by weight $Cl^-$, corresponding to an acid number of 1.24.

937 ml (1526 g) of the solution were treated with 230 g of 96% by wt. strength (i.e., 1760 g/l concentration) $H_2SO_4$ in order to raise the acid number to 1.84, and made up to 1310 ml with water in order to establish a $TiO_2$ concentration of 281 g/l.

1260 ml of this solution were heated at boiling point for 4.5 hours, after the addition of hydrolysis seeds, during which 280 ml dilution water were added in this period. The hydrolysate was filtered off and dried at 130° C. 330 g (90% yield) of a finely divided anatase hydrolysate were obtained, the analysis data being summarised in Table 1.

50 g of the product were calcined for 1 hour at 900° C. after the addition of rutile seeds. The analysis data for the calcined product obtained are also given in Table 1.

TABLE 1

| Analysis data for example 1 | | |
|---|---|---|
| | Hydrolysate | Calcined product |
| Na [ppm] | 1.5 | 11.5 |
| Fe [ppm] | 1 | 1 |
| Nb [ppm] | <1 | 4.5 |
| Cr [ppm] | <1 | <1 |
| V [ppm] | <1 | <1 |
| Cl [ppm] | 95 | <30 |
| $SO_4$ [%] | 3.3 | 0.02 |
| BET [m²/g] | 213 | 4.8 |
| Particle size distribution: | | |
| D[4,3][1] [μm] | 0.89 | 9.25 |
| Rutile [%] | — | 99.8 |
| Whitening power (AV)[2] | — | 55 [375] |
| rel. scattering power ($S_{rel}$)[3] | 124 | — |
| rel. colour cast[4] | 2.3; blue | 3.4; yellow |

[1] Average of volume distribution according to DIN 53 206, measured with a Malvern Mastersizer
[2] AV: according to DIN/ISO 787/24
[3] $S_{rel}$: according to DIN/ISO 787/24
[4] rel. colour cast: according to DIN 55 981

Example 2 (comparison)

1,000 g of $TiCl_4$ were added dropwise from a dropping funnel to 2,579 g of 70% by wt. strength (i.e., 1130 g/l concentration) $H_2SO_4$ in a 6 l flask with a heating mantle, stirrer, reflux condenser and thermometer, at 80° C. and over the course of 7.5 hours. The clear, yellow solution which formed with the development of HCl was treated with 1,559 g of 25.5% by wt. strength (i.e., 300 g/l concentration) $H_2SO_4$, in order to establish a total sulphuric acid content in solution of about 50% by weight, (i.e. 700 g/l concentration) and heated to boiling point. 75 minutes after reaching reflux temperature, crystallisation of titanyl sulphate dihydrate started. The mixture was held at reflux temperature for a further 90 minutes to complete crystallisation. The resulting thick crystal paste had to be diluted with a further 1,000 g of 50% by wt. strength $H_2SO_4$ during this period in order to remain stirrable.

Filtration, with the application of pressure, produced 1,748 g of a white filter cake with a content of $TiOSO_4.2H_2O$ of 53.4%, determined by baking to give $TiO_2$, corresponding to a yield of 90.5%, relative to the $TiCl_4$ used.

To prepare the most concentrated possible aqueous solution, 1,570 g of the filter cake were treated with 1,100 g of water. After stirring for 48 hours at room temperature and filtering off the relatively small undissolved fraction, the result was 2,628 g of an almost colourless saturated solution with 12.5% by weight ( i.e., 173 g/l concentration) of $TiO_2$, 30.3% by weight ( i.e., 420 g/l concentration) of $SO_4^{2-}$ and 0.021% by weight ( i.e., 0.3 g/l concentration) of $Cl^-$, corresponding to an acid number of 2.50.

1,800 ml (2,486 g) of this solution were heated for 4.5 hours at boiling point, after the addition of hydrolysis seeds. The hydrolysate was filtered off and dried at 130° C. 255 g (82% yield) of an anatase hydrolysate were obtained, the analysis data being summarised in Table 2.

50 g of the product were calcined for 1 hour at 900° C. after the addition of rutile seeds. The analysis data for the calcined product obtained are also given in Table 2.

TABLE 2

| Analysis data for example 2 | | |
|---|---|---|
| | Hydrolysate | Calcined product |
| Na [ppm] | 7 | 30 |
| Fe [ppm] | 2 | 4.5 |
| Nb [ppm] | <1 | 4.5 |
| Cr [ppm] | <1 | <1 |
| V [ppm] | <1 | 1 |
| Cl [ppm] | 35 | 45 |
| $SO_4$ [%] | 9.3 | 0.21 |
| BET [$m^2/g$] | 134 | 1.7 |
| Rutile [%] | — | 99.8 |
| Particle size distribution: | | |
| D[4,3][1] [μm] | 2.96 | 3.34 |
| Whitening power (AV)[2] | — | 32 [215] |
| rel. scattering power ($S_{rel}$)[3] | 77 | — |
| rel. colour cast[4] | 1.4 (yellowish-red) | 3.2 (yellow) |

We claim:

1. A process for the preparation of pure titanium dioxide, consisting essentially of reacting titanium tetrachloride with sulphuric acid at a concentration of 25–35% by weight to form a titanyl sulphate solution under conditions that prevent the crystallization of titanyl sulphate in said solution, separating the resulting hydrogen chloride, concentrating the solution and then adding sulphuric acid to adjust the weight ratio of sulphuric acid to titanium dioxide to between 1.7 and 2.0 and adjusting the titanium dioxide concentration to between 250 and 300 g/l, hydrolyzing the solution to form a precipitate of titanium dioxide hydrate, filtering off the resulting titanium dioxide hydrate precipitate, and then calcining the precipitate to form titanium dioxide in the rutile or anatase form.

2. A process according to claim 1, wherein the amount of sulphuric acid is between 100 to 120% of the stoichiometrically required amount for the reaction of titanium tetrachloride to give titanyl sulphate.

3. A process according to claim 1, wherein the reaction of titanium tetrachloride with aqueous sulphuric acid is performed at temperatures between 20° and 70° C.

4. A process according to claim 1, wherein the hydrogen chloride eliminated as a side product in the reaction of titanium tetrachloride with aqueous sulphuric acid is separated out by evaporating the solution or by passing a gas through the solution.

5. A process according to claim 4, wherein the gas is air.

6. A process according to claim 4, wherein the gas is passed through the solution at a temperature between 50° C. and 80° C.

7. A process according to claim 6, wherein the gas is passed through the solution at a temperature between 50° and 70° C.

8. A process according to claim 1, wherein the hydrogen chloride is removed down to a concentration of less than 5% by weight, relative to the dissolved titanium dioxide.

9. A process according to claim 1, wherein said adding of sulphuric acid to adjust the weight ratio of sulphuric acid and said adjusting of the titanium dioxide concentration to between 250 and 300 g/l take place immediately before hydrolysis by adding water and sulphuric acid or oleum.

10. The process of claim 1, wherein said titanyl sulphate solution is filtered after said resulting hydrogen halide is separated from said solution and said solution has been concentrated.

* * * * *

UNITED STATES PATENT AND TRADEMARK OFFICE
CERTIFICATE OF CORRECTION

PATENT NO. : 5,468,463
DATED : November 21, 1995
INVENTOR(S) : Butje, et al.

It is certified that error appears in the above-indentified patent and that said Letters Patent is hereby corrected as shown below:

Title Page      ABSTRACT: Last line delete " futile " and substitute -- rutile --

Col. 6, line 22      Delete " chlande " and substitute -- chloride "

Col. 6, line 28      Delete " 50°C. " and substitute -- 20°C. --

Signed and Sealed this

Twenty-first Day of May, 1996

Attest:

BRUCE LEHMAN

Attesting Officer      Commissioner of Patents and Trademarks